United States Patent

[11] 3,618,967

| [72] | Inventor | Genshiro Sugiyama<br>Tokyo, Japan |
|---|---|---|
| [21] | Appl. No. | 17,797 |
| [22] | Filed | Mar. 9, 1970 |
| [45] | Patented | Nov. 9, 1971 |
| [73] | Assignee | Sugiyama Manufacturing Co., Limited |

[54] BABY CAR
3 Claims, 6 Drawing Figs.

| [52] | U.S. Cl. | 280/47.11, 280/36 B |
|---|---|---|
| [51] | Int. Cl. | B60g 1/00 |
| [50] | Field of Search | 280/47.11, 47.38, 80 R, 81 A, 64, 36 B |

[56] References Cited
UNITED STATES PATENTS

| 2,589,679 | 3/1952 | Dennesen | 280/47.11 |
| 2,669,460 | 2/1954 | Wallner | 280/47.38 |
| 2,471,985 | 5/1949 | Trondle | 280/47.11 |
| 2,877,023 | 3/1959 | Shaffer | 280/81 A |

*Primary Examiner*—Leo Friaglia
*Assistant Examiner*—Robert R. Song
*Attorney*—Watson, Cole, Grindle & Watson

ABSTRACT: A baby carriage having caster wheels at its front end together with spring actuated mechanism for resiliently yieldably urging said wheels to a position for guiding the carriage in a rectilinear path, said mechanism being automatically yieldable in response to steering forces on the carriage to permit angular steering movement of the wheels so that they may follow a curved path of movement.

INVENTOR
Genshiro Sugiyama
BY
Watson, Cole, Grindle & Watson
ATTORNEY

PATENTED NOV 9 1971 3,618,967

INVENTOR
Genshiro Sugiyama
BY
Watson, Cole, Grindle & Watson
ATTORNEY

BABY CAR

This invention relates to a baby car in which one side section *a* of a L-shaped hinge plate 4 is hinged to the edge of a support plate 2 fixed to a car body frame arm 1 by using a hinge axis 3, the lowermost edge of the other side section *b* of said L-shaped hinge plate 4 is rolled up in form of a bushing so as to put a wheel shaft 5 therethrough, a bolt 6 around which a spiral spring 8 is loosely engaged through said other side section *b* and an elastic piece 7 is engaged with said bolt *b* so as to turn freely the direction of a car body A. The object of this invention is to provide a baby car of which direction is easily and freely turned to the right or to the left during running by control of a pushing force applied to a control bar and automatically restores the original direction.

BRIEF DESCRIPTION OF DRAWING

The annexed drawing shows a preferred embodiment of the baby car according to this invention in which:

FIG. 5 is a sectional plan view of the main part of the same, as running right on;

DETAILED DESCRIPTION OF INVENTION

Figure 1:
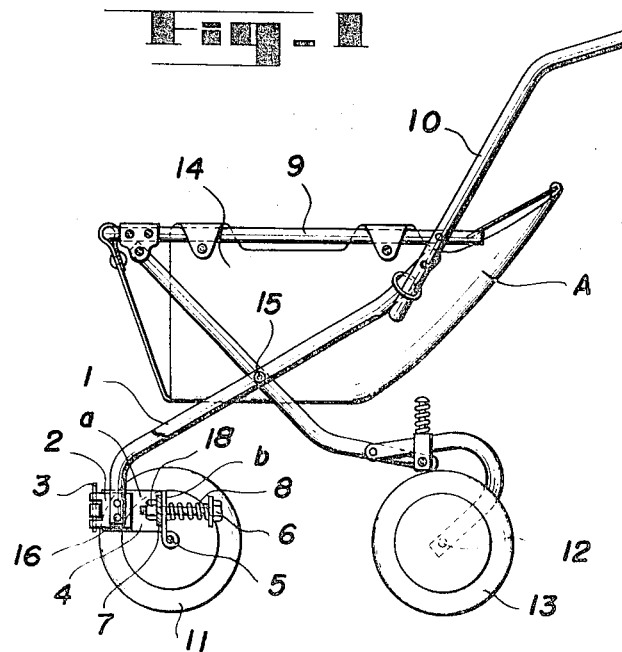
FIG. 1 is a side view of the same.
Figure 2:
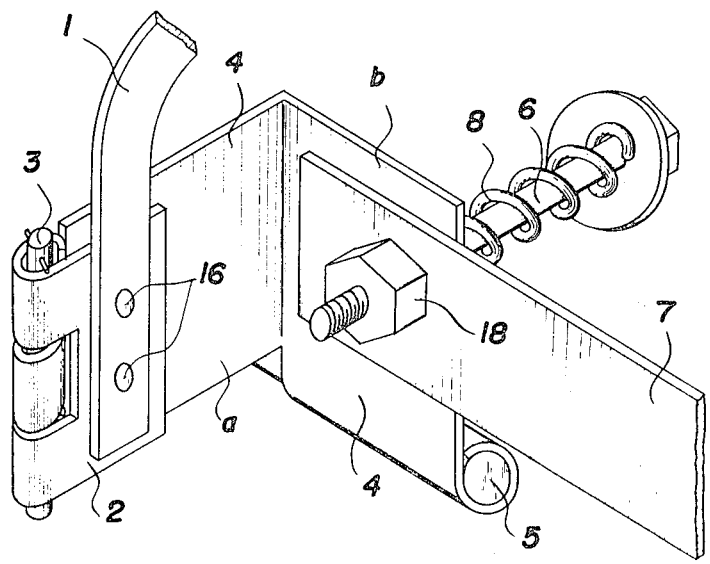
FIG. 2 is an enlarged perspective view of the main part of the same.
Figure 3:
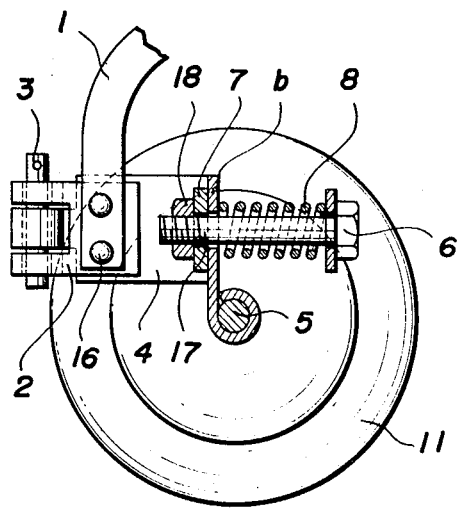
FIG. 3 is a sectional side view of the main part of the same.
Figure 4:
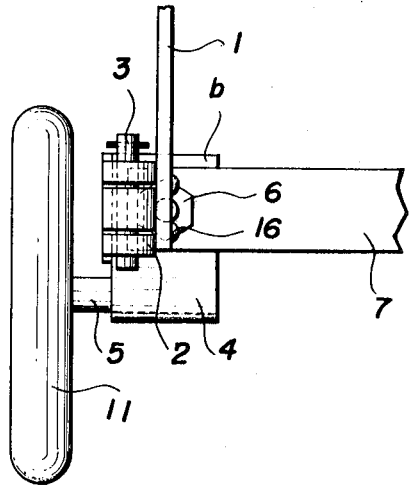
FIG. 4 is a frontal view of the main part of the same.
Figure 5:
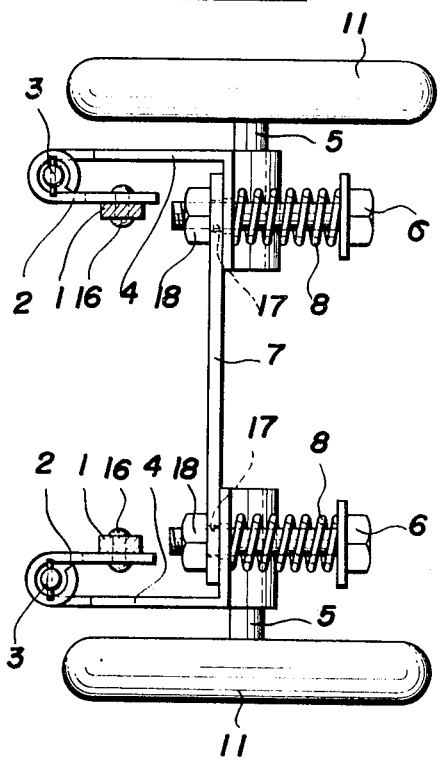
Figure 6:
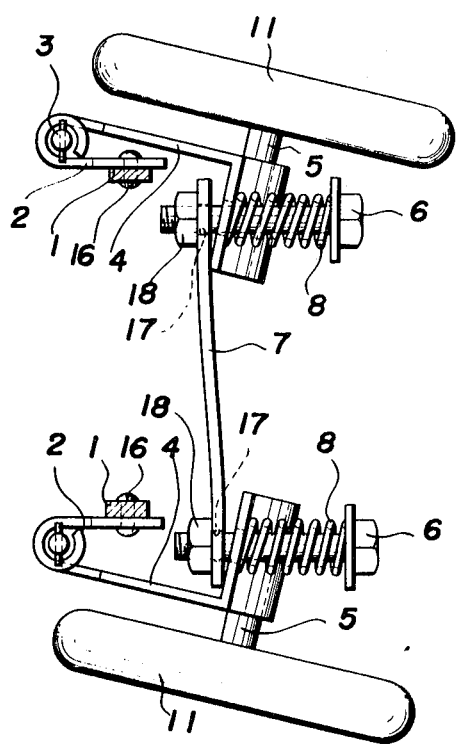
FIG. 6 is a sectional plan view of the main part of the same, as turning the direction.

Now referring to the annexed drawing which illustrate an embodiment of this invention, a car body A generally comprises car frame arms 1 1 in form of X, a hand rail 9 pivotally mounted to the fore one of said arms 1 1 at upper end thereof, a control bar 10 rockably mounted to the aft one of said arms 1 1 at upper end thereof through said hand rail 9, L-shaped hinge plate 4 through which front wheels 11 are mounted on said fore one of said arms 1 1 and a wheel shaft 12 journaled in said aft one of said arms 1 1 at lower end thereof so as to carry rear wheels 13. A hammock 14 depends from said hand rail 9 of the car body A. The car body frame arms 1 1 collapsibly cross each other in form of X at a pivot 15 and lower end of the fore one is bent downward to form a vertical portion of said arm to which the support plate 2 is fixed by members such as rivets or screws 16. The support plate 2 fixed to the body frame arm 1 has an extension rolled up as a bushing through which the hinge axis 3 is inserted, and one side section *a* of said L-shaped hinge plate 4 is swingably mounted around said hinge axis 3. Around the hinge axis 3 at midway thereof, one sideplate *a* of the L-shaped hinge plate 4 is rolled up and, likewise the support plate 2 is rolled up around said axis. Thus, the hinge axis 3 swingably supports the plate 4. The hinge plate 4 is bent to form an L shape in cross section, the side edge of one section *a* of L plate 4 being rolled up around the hinge axis 3 while the lower edge of the other section *b* of L-plate 4 is also rolled around the wheel shaft 5, and is upright fixed in parallel to said wheel shaft 5.

Said other section *b* of the hinge plate 4 is provided with a hole 17 through which a bolt 6 is inserted from outer side of said other section *b*. Said bolt 6 also passes through the elastic piece and projecting therefrom, the end of thus projecting bolt 6 is fixed by a nut 18 spaced apart from said L-shaped hinge plate 4.

The horizontal wheel shaft 5 is provided at the ends thereof with front wheels 11 in a rotatable manner, and around the inner armlike portion thereof with the lower edge of the other section *b* of the L-shape hinge plate 4 horizontally rolled so that the front wheels 11 rotate in the direction along which the car body A straightly moves.

The bolt 6 loaded with the spiral spring 8 therearound is loosely inserted through and projects from the hole 17 of the other sideplate *b* of the L-shape hinge plate 4. This projection of said bolt is passed through the elastic piece 7, and the nut 18 is screwed on the end of said projection with spacing from the L-shaped hinge plate 4 so as to cooperate with said spiral spring 8.

The piece 7 may be a resiliently flexible metal band plate which has a hole 17 through which the bolt 6 projecting from the L-shaped hinge plate 4 is fitted so as to engage with said L-shape hinge plate 4. Accordingly, though deviation of turning angle between both right and left wheels 11 11 as well as the axes of the wheels shafts 5 5 as the direction of the car body A is turned, the elastic piece 7 properly bends due to its flexibility, compensating such a deviation and thereby permitting the car body A to be turned smoothly and easily.

When the car body A is returned in the original straight direction again, the elasticity of the piece 7 cooperates with biasing force of the spiral springs 8 so that the wheels 5 5 rapidly restore the original direction of the car body A.

The spiral spring 8 is mounted around the bolt 6 so as to be compressed between the L-shape hinge plate 2 and the head of the bolt 6. As the direction of the car body A is turned, the L-shaped hinge plate 4 moves causing the spiral spring 8 to operate so that the bolt 6 projects further out of the L-shaped hinge plate 4.

As a result, the elastic piece 7 now out of engagement with the L-shape hinge plate 4 is urged against the nut 18 and bent so that the turning angle of the wheels 5 5 is kept in desired extent.

When the car body A is turned in the straight direction thereof, the L-shape hinge plate 4 is rapidly returned to its original position under action of the spiral spring 8 and at the same time the axes of both right and left wheels 5 5 are returned to the same axis, so said wheels 5 5 restore the original straight direction along which the car body A moves. According to this invention as mentioned above, a car body frame is provided at its lower edge with a L-shaped hinge plate hingeably mounted thereon, with which an elastic piece is engaged through a bolt loaded with a spiral spring, so that the one of hands gripping the control bar opposite to the direction to which the car body is to be turned may be slightly stronger than the other for easily turning the direction of the car body. This means that even woman or child may easily operate the baby car of this invention. Furthermore, the baby car according to this invention is very useful in it that restoration of the car body to the original straight direction is automatically and rapidly achieved due to action of the elastic piece and the spiral spring without any external force and manipulation.

It will thus be seen that the members 4 constitute wheel brackets which are hingedly connected to the frame 1 for angular steering movement about vertical axes 3 which are spaced apart transversely to the path of travel of the baby car or carriage, the wheels 11 being carried by the brackets for rotation about horizontal axes 5 which are displaced substantially rearwardly from their vertical steering axes 3 with respect to the path of forward travel of the carriage, so that each wheel in substance is arranged in the manner of a caster wheel.

Further, in accordance with the invention, the wheel brackets 4 are respectively provided with vertically directed flat surface portions *b* disposed transversely to the path of movement of the carriage, and the plate 7, extending transversely between the brackets, is formed with a vertically directed flat surface for flush engagement with the flat surface portions *b*, respectively, of the brackets 4. The plate or crossbar 7 serves to interconnect the wheel brackets 4—4 for angular movement together about their steering axes 3, being connected to the respective brackets by the bolts 6, and the resiliently yieldable spring means 8 on the bolts urge the flat surface of the plate 7 into flush engagement with the vertically directed flat surfaces *b* of the respective brackets 4 so as to resiliently yieldably maintain the wheels 11 in parallel rectilinear paths of movement while, nevertheless permitting angular steering movement of the brackets 4 and their associated wheels responsive to lateral steering forces exerted on the vehicle frame 1.

I claim:

1. A baby carriage comprising a body having a pair of transversely spaced frame arms 1, a vertically extending support plate 2 fixed to each of said frame arms, a pair of L-shaped hinge plates 4, each having a side section *a* thereof hinged to said support plate for angular movement about a vertical hinge axis 3, a horizontal wheel shaft 4 supported by the other side section *b* of each said L-shaped hinge plate and extending perpendicular to said hinge axis, a resiliently flexible piece 7 extending between and carried by the respective hinge plates 4, bolts 6 extending through and interconnecting said piece 7 with the respective said hinge plates 4, said piece 7 and said hinge plates, respectively, having flat surfaces around said bolts 6 disposed for flush engagement with each other in given angular positions of said hinge plates 4 about their vertical hinge axis 3, each said hinge plate loosely receiving and being angularly movable on its bolt 6 relative to the axis of said bolt, and a compression spring 8 on each said bolt urging said piece 7 and said hinge plate 4 toward each other.

2. A wheeled baby carriage adapted for ground traversing movement and comprising a frame, a pair of wheel brackets 4 hingedly connected to said frame for angular steering movement about vertical axes 3 which are spaced apart transversely to the path of travel of said carriage, wheels carried by said brackets for rotation about horizontal axes displaced substantially rearwardly from said vertical axes with respect to the path of travel of said carriage, said wheel brackets respectively being provided with vertically directed flat surface portions disposed transversely to the path of movement of the carriage, a plate extending transversely between said brackets and having a vertically disposed flat surface for flush engagement with said flat surface portions, respectively, of the brackets, bolts loosely connecting said plate to the respective brackets to permit angular steering movement of the brackets relative to said plate, resiliently yieldable means urging the flat surface of said plate into flush engagement with the said vertically directed flat surface of the respective brackets whereby to resiliently yieldably maintain said wheels in parallel rectilinear paths of movement but to permit angular steering movement of said brackets and wheels incident to lateral control force exerted on said frame.

3. A baby carriage as defined in claim 2, in which said plate is resiliently flexible.

* * * * *